United States Patent [19]

Wollar

[11] 4,405,272

[45] Sep. 20, 1983

[54] TWO-PIECE FASTENER WITH FRONT SHOULDER

[75] Inventor: Burnell J. Wollar, Barrington, Ill.

[73] Assignee: Phillips Plastics Corporation, Phillips, Wis.

[21] Appl. No.: 242,686

[22] Filed: Mar. 11, 1981

[51] Int. Cl.³ .............................................. F16B 13/04
[52] U.S. Cl. ...................................... 411/41; 411/45; 411/57
[58] Field of Search ....................... 411/41, 40, 39, 43, 411/57, 72, 71, 44, 15, 510, 45

[56] References Cited

U.S. PATENT DOCUMENTS

| | | | |
|---|---|---|---|
| 2,542,144 | 2/1951 | Kearns | 411/41 |
| 2,813,568 | 11/1957 | Kilmarx | 411/41 X |
| 2,941,439 | 6/1960 | Rapata | 411/41 |
| 3,449,799 | 6/1969 | Bien | 411/510 X |
| 3,728,761 | 4/1973 | Holly | 411/57 |
| 4,276,806 | 7/1981 | Morel | 411/41 |

FOREIGN PATENT DOCUMENTS

| | | | |
|---|---|---|---|
| 502703 | 5/1954 | Canada | 411/57 |
| 1163400 | 9/1969 | United Kingdom | 411/41 |
| 1239409 | 7/1971 | United Kingdom | 411/41 |
| 642529 | 1/1979 | U.S.S.R. | 411/57 |

*Primary Examiner*—Ramon S. Britts
*Attorney, Agent, or Firm*—James E. Nilles

[57] ABSTRACT

The fastener of the invention has a sleeve-like body with a laterally enlarged head at a rear end thereof, a fixed diameter rear portion forwardly adjacent to the head, and at least three forwardly opening longitudinal slots defining as many forwardly projecting legs. A plunger insertable into the body to a forward operative position holds the front ends of the legs flexingly diverged to confine the fastener in a blind hole. At its front end each leg has a radial protuberance with a flat rear surface, the rear surfaces of the protuberances being coplanar and normal to the body axis when the legs are diverged. A rearwardly facing circumferential shoulder on the plunger is engaged by detent lugs in the body, near the rear ends of the slots, to define a preliminarily assembled position of the plunger and is detentingly engaged by forwardly facing surfaces on the legs, near their front ends, in the operative position of the plunger.

4 Claims, 6 Drawing Figures

TWO-PIECE FASTENER WITH FRONT SHOULDER

FIELD OF THE INVENTION

This invention relates to improvement in a two-piece plastic fastener comprising a sleeve-like body receivable in a round hole in a workpiece and having a head at a rear end thereof and forwardly projecting legs, and further comprising a plunger forwardly insertable into the body to maintain the legs diverged so that the plunger is confined against axial displacement relative to the workpiece; and the invention is more particularly concerned with a fastener of the character described that is especially well adapted for installation in a workpiece comprising two or more parts which are secured together by the fastener and which must or can have slight motion relative to one another.

BACKGROUND OF THE PRIOR ART

Plastic fasteners of the general type to which this invention relates have been available in a variety of forms. Each of the various species of such fasteners has been intended to be particularly satisfactory in one type of application while being more or less acceptable for at least a few other applications; but every such fastener has had limitations along with its desirable features. Thus the plastic fastener of U.S. Pat. No. 3,417,438 to T. J. Schuplin was suitable for insertion into a square or rectangular hole in a workpiece but was not well suited for installation in a more conventional round hole. Fasteners suitable for round holes are disclosed in U.S. Pat. Nos. 4,083,289 to Erickson and 3,385,158 to Morin, but the fastener of the Erickson patent was not well suited for installations that were subjected to substantial vibration, and that of the Morin patent, although better suited for withstanding vibration, presented installation problems because its plunger had to be maintained in a critical rotational orientation as it was driven forwardly in the body to its operative position.

Notwithstanding the variety of designs and configurations for plastic fasteners that have been available, there has been a long-standing and heretofore unsatisfied need for a plastic fastener which could be installed in a round hole in a workpiece, could sustain severe vibration, and would be satisfactory for securing together a pair of parts or elements that could have slight motion relative to one another. A typical application for a fastener of the type here under consideration would be for securement of a high density plastic fascia that wraps around the front end portion of an automobile body just above the bumper. The plastic fascia must be permitted to have small motions relative to adjacent body parts, so that it has no tendency to ripple or wrinkle under the influence of road bumps and engine vibrations, but it must nevertheless be fastened securely.

In most prior fasteners of the general type here under consideration, the sleeve-like body of the fastener was so configured that its front end portion was forwardly flared when the plunger was fully inserted into it, so that if the fastener was displaced axially rearwardly relative to a workpiece in which it was installed, its flared front end portion wedged itself more and more snugly against the edge of the hole in which the fastener was seated. This made for a tight connection if the workpiece comprised a relatively hard front panel or part against which the front end portion of the fastener engaged, and such an arrangement was usually very satisfactory for an assembly that was not subject to vibration. Under vibration, however, the fastener and edge portions of the hole could impose very high localized forces upon one another, owing to the wedging relationship between them, and the hole or the fastener could eventually become deformed to the extent of permitting noticeable loosening or total failure of the connection made by the fastener. Of course, such a fastener tended to oppose even slight relative motion between the connection parts and was therefore unsatisfactory for installations where such relative motions had to be permitted.

SUMMARY OF THE INVENTION

The general object of the present invention is to provide a two-piece fastener of the character described that is receivable in blind round hole in a two-part workpiece which fastener is so configured that it does not exert any substantial force against edge portions of a hole wherein it is installed but, instead, has opposing abutments on end portions of its body that flatwise engage opposite surfaces of the workpiece to confine the fastener against axial displacement relative to the workpiece.

More generally, therefore, it can be said to be an object of this invention to provide a two-piece fastener of the character described, receivable in a blind round hole in a workpiece that comprises a pair of parts or elements connected by the fastener, said fastener being particularly suitable for applications where the connected parts or elements must have, or may have, some freedom for motion relative to one another, including relative rotation about the axis of the fastener.

The fastener of this invention is not intended to serve as a small axle or a trunnion, although it could undoubtedly be so employed in some cases. Rather, it is intended for situations where the parts or elements that it connects tend to make small but more or less frequent or steady motions relative to one another, as under the influence of vibration, and where it is undesirable to subject one or both of the parts to localized stresses at the fastener connection.

Another object of this invention is to provide a fastener of the character described that is easy and inexpensive to manufacture and is also capable of being readily installed without the need for a special tool or special skill, its ease of installation being due to a feature that provides a preliminarily assembled position of the plunger in the sleeve-like fastener body, from which position the plunger can be driven forwardly to its operative position in the body while receiving a substantial amount of guidance from the body that steadies it against tilting relative thereto.

It is also an object of the invention to provide a reuseable fastener of the character described that comprises a sleeve-like body and a plunger, wherein the plunger can be in any rotational orientation relative to the body when it is driven forwardly therein to an operative position in which it secures the fastener in a workpiece; wherein the plunger remains securely in its forward operative position even under severe vibration; and wherein the plunger can be partially withdrawn to a position in which the fastener can be removed but in which the plunger nevertheless remains assembled with the body.

These and other objects of the invention which will appear as the description proceeds are achieved in a fastener comprising a sleeve-like body that is forwardly insertable into a round hole in a workpiece, said body having a laterally enlarged head at a rear end thereof and having longitudinal slots extending to its front end that define at least three forwardly projecting flexible legs which are disposed symmetrically to its axis, said fastener further comprising a plunger that is forwardly insertable into the body to maintain said legs forwardly diverged against flexing bias so that they and the head can cooperate with opposite surfaces of a workpiece in which the fastener is received to confine the fastener against axial displacement relative to the workpiece. The fastener of this invention is characterized by cooperating camming surfaces on the plunger and on the legs of the body whereby forward insertion of the plunger to an operative position in the body forwardly diverges the legs, swinging each leg through a predetermined acute angle from a relaxed position to an extended position. Each of the legs has an external surface which extends along a substantial portion of its length and which, in the relaxed position of the leg, is forwardly and radially inwardly inclined to the body axis at said acute angle, so that a forward portion of the body is forwardly tapered and frustoconical when the legs are in relaxed positions but is untapered and substantially cylindrical when the legs are in extended positions. Each of the legs has on its front end portion a radially outwardly projecting protuberance that has a substantially flat rear surface which is substantially normal to said external surface on the leg and which can therefore flatwise engage a front surface of a workpiece in which the fastener is received when the legs are in their extended positions.

Preferably, in the fastener of this invention, the plunger has a concentric reduced diameter portion, near its front end but spaced therefrom, which defines a circumferential rearwardly facing shoulder on the plunger. The body has in its interior, near its rear end, radially inwardly projecting means defining a forwardly facing abutment engageable with said shoulder to define a preliminarily assembled position of the plunger wherein the plunger is retained against separation from the body but is spaced to the rear of its operative position. Each of the legs has near its front end an inner forwardly facing abutment engageable with said shoulder on the plunger to define the operative position of the plunger.

BRIEF DESCRIPTION OF DRAWINGS

In the accompanying drawings, which illustrate what is now regarded as a preferred embodiment of the invention.

DETAILED DESCRIPTION OF PREFERRED EMBODIMENTS OF THE INVENTION

Figure 1:
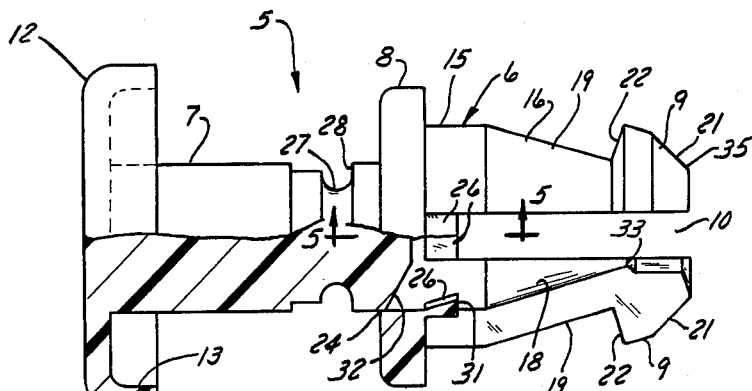
FIG. 1 is a view of the fastener of this invention, partly in side elevation and partly in longitudinal section on the plane of the line 1—1 in FIG. 2, the fastener being shown in its condition immediately after being molded.
Figure 2:
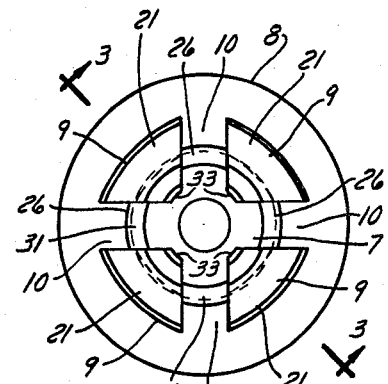
FIG. 2 is a front end view of the fastener shown in FIG. 1.

A fastener 5 that embodies the principles of this invention comprises, in general, a sleeve-like body 6 and a plunger 7 that is axially forwardly insertable into the body. The body 6 has a concentric, circumferentially enlarged flange-like head 8 at a rear end thereof and has three or more forwardly projecting legs 9, defined by a like number of slots 10 that extend along most of the length of the body and open to its front end. In the present case there are four longitudinal slots 10 in the body, defining four legs 9. According to the invention, the legs 9 are arranged symmetrically in relation to the longitudinal axis of the sleeve-like body and they are resiliently flexible for radially inward and outward swinging of their front end portions.

Figure 4:
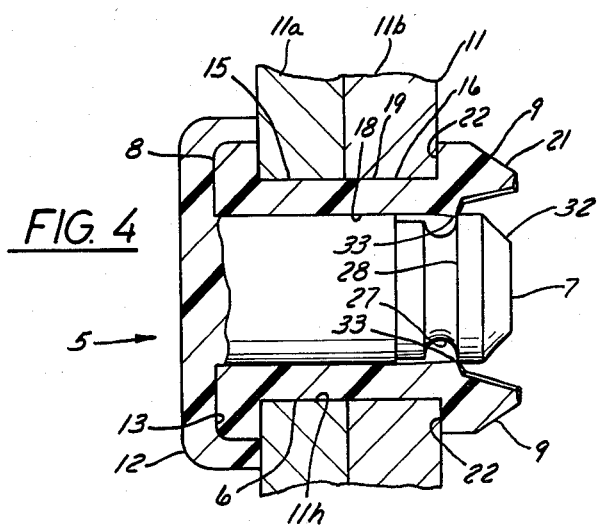
FIG. 4 is a view generally similar to FIG. 3 but showing the fastener in its completely installed relationship to a workpiece.

The fastener 5 is intended to connect two parts or elements 11a, 11b which, together, comprise a workpiece 11. The body 6 of the fastener is insertable forwardly into a round hole 11h in the workpiece 11, defined by registering bores in its elements 11a, 11b; and after being inserted into the hole 11h the fastener is secured to the workpiece by movement of the plunger 7 to a forward operative position (FIG. 4) in the body at which the plunger maintains the legs 9 flexed in a forwardly divergent relationship.

The plunger 7 is in this case substantially cylindrical, and it may have a concentric radially enlarged head 12 at its rear end that overlies the head 8 on the body when the plunger is in its operative position. If desired, the head 12 on the plunger can be the same diameter as the end 8 on the body, or it can be of smaller diameter; but in the embodiment here illustrated, which is preferred for some purposes, the plunger head 12 is of somewhat larger diameter than the body head 8 and is hollowed out at its front side as at 13, to be more or less bowl-shaped and forwardly concave, so that the head 8 on the body can be received within the forwardly opening cavity 13 in the plunger head and the latter can completely overlie and conceal the body head 8 when the plunger 7 is in its forward operative position. For an application where withdrawal of the plunger from its operative position is undesirable, the plunger 7 can of course be made without a head, to have its rear end flush with the head 8 on the body when it is in its operative position.

A relatively short rear end portion 15 of the sleeve-like body 6, extending forwardly from its head 8, is tubular and untapered, which is to say that both the inside diameter and the outside diameter of this portion of the body are constant along its length. The inside diameter of this rear portion 15 of the body is such as to receive the plunger 7 with a sliding fit, and its outside diameter is such that it can have a sliding fit in the hole 11h for which the fastener is intended. In the preferred embodiment here illustrated, the constant diameter rear portion 15 of the body extends from the head 8 forwardly to about one-third of the length of the body from its rear end although this proportioning is obviously not critical. The slots 10 between the legs 9 extend rearwardly for some distance into this rear portion 15 of the body.

The tubular rear portion 15 of the body continues at its front end into a rather long medial portion 16 of the body that extends forwardly to within a short distance from its front end. The slots 10 extend through the full length of this medial portion 16 of the body, and with the legs 9 in their relaxed or unflexed conditions, in which they are shown in FIG. 1, this portion 16 of the body has both an inside surface 18 and an outside surface 19 that are frustoconical and forwardly tapering. Preferably the thickness of the legs 9, as measured in the direction radial to the body axis, is constant all along this medial part 16 of the body, so that both the inner surface 18 and the outer surface 19 are inclined forwardly and radially inwardly at the same acute angle to the body axis. It will be apparent that as the plunger 7 is moved forward in the body towards its operative position, the front end portion of the plunger and the inner forwardly convergent surfaces 18 of the legs 9 comprise cooperating cam surfaces that translate such forward plunger movement into flexed radially outward swinging of the front ends of the legs. As the legs are thus flexed to their diverged positions shown in FIG. 4, each of them is swung through an acute angle equal and opposite to the angle at which the outer surface 19 of the leg had been inclined to the body axis, and therefore these outer surfaces 19 are brought to parallelism with the body axis, which is to say that the medial portion 16 of the body then has the same outside diameter all along its length as the cylinder rear portion 15. Accordingly, the body exerts no substantial lateral forces against the edge of the hole 11h in which the fastener is received.

To confine the fastener against axial displacement relative to a workpiece 11, each of the legs 9 has its front end portion formed as a radially outward protuberance 21 having a flat rear surface 22 that is normal to the adjacent outer surface 19 of the medial portion 16 of the body. When the legs 9 are in their relaxed, forwardly convergent relationship, the diametrical distance across the radially outermost portions of the protuberances 21 is less than the outside diameter of the tubular rear portion 15 of the fastener body, so that the protuberances 21 present no interference to insertion of the fastener into a workpiece hole 11h. With the legs 9 flexed to their diverged positions, the flat rear surfaces 22 of the protuberances 21 are coplanar with one another and cooperative to define a rearwardly facing ledge or shoulder that opposes the head 8 on the rear of the fastener body. The head 8 and the protuberances 21 cooperate with opposite surfaces of a workpiece 11 in which the fastener is installed to confine the fastener against axial displacement relative to the workpiece; hence, the distance from the head 8 on the fastener body to the rear surfaces 22 on the protuberances 21 is selected in accordance with the thickness of the workpiece for which the fastener is intended.

At the extreme front end portion of the body the external surfaces of the protuberances 21 preferably define a relatively abrupt forward taper or bullet nose 35 that helps to guide the body into a hole in which it is inserted.

Figure 6:
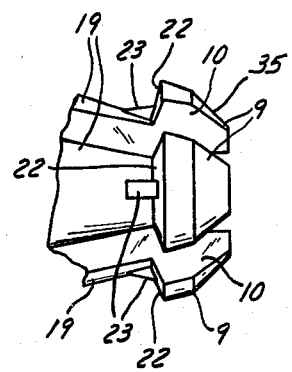
FIG. 6 is a view in side elevation of the front end portion of the fastener body in relaxed condition, illustrating a modified embodiment of the invention.

In some installations it may be desirable to confine the fastener against rotational and other motion relative to a workpiece in which it is installed, and in such cases the exertion of localized forces against edge portions of the fastener hole in the workpiece may be acceptable or even desirable. For such applications the body of the fastener can be formed (as shown in FIG. 6) with a narrow, longitudinally extending land or rib 23 on each leg, extending to the rear protuberance surface 22 on the leg from a point on the leg that is spaced a little distance behind that protuberance. As measured radially, each such rib 23 will be rather shallow. It will be apparent that when the legs 9 are diverged, the ribs 23 will make very localized wedging engagement with edge portions of the hole 11h in the workpiece, at circumferentially equidistant locations around the hole and adjacent to the front surface of the workpiece.

As the fastener 5 is initially molded, the plunger 7 is formed in one concentric piece with the sleeve-like body 6, projecting only a very small distance into the rear of the body so that the connection between the body and the plunger comprises a fragile flashing 24. At the conclusion of the molding operation, the core (not shown) that defines the hollow interior of the body is withdrawn forwardly, and—preferably while the piece is still in the molding machine—forward force is applied to the plunger to break the flashing 24 and drive the plunger into the rear portion 15 of the body, to a preliminarily assembled relationship with the body wherein the legs 9 can remain in their unflexed condition.

Figure 3:
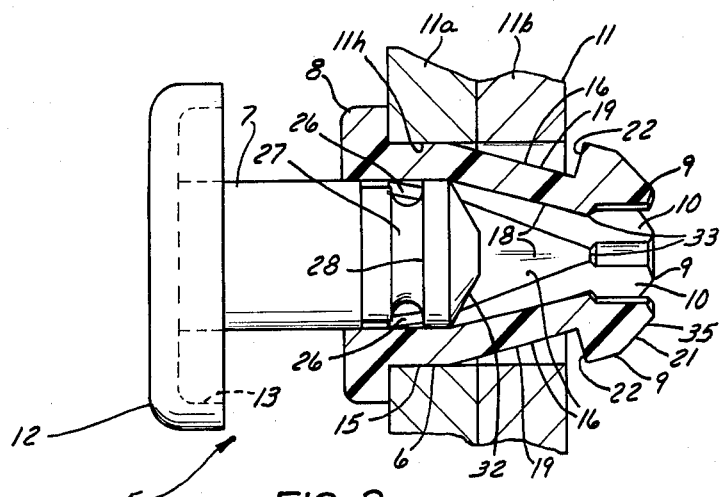
FIG. 3 is a view in longitudinal section, taken on the plane of the line 3—3 in FIG. 2, showing the fastener in its preliminarily assembled condition, ready for installation in a workpiece.
Figure 5:
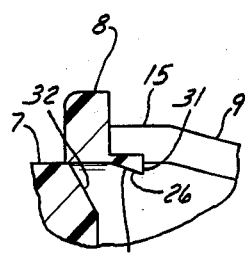
FIG. 5 is a detail sectional view taken on the plane of the line 5—5 in FIG. 1.

This preliminarily assembled relationship, which is illustrated in FIG. 3, is detent defined by means of radially inwardly projecting detent lugs 26 in the rear portion 15 of the body and a circumferential groove or recess 27 in the plunger, spaced a little distance behind its front end and providing a circumferential rearwardly facing shoulder 28 against which the lugs 26 can engage. As best seen in FIG. 5, each of the detent lugs 26 is, in effect, formed in the rear end portion of one of the slots 10 between the body legs 9, extending across the slot and being rather shallow as measured in the radial direction of the body so as to be readily flexible radially outwardly. The inner surface 30 of each lug 26 merges rearwardly into the inside diameter of the body at its head 8 and is inclined forwardly and radially inwardly, terminating at a forwardly facing surface 31 on the lug with which the inner lug surface 30 makes an acute-angle corner. The front end of the plunger 7 preferably has a blunt forward taper, as at 32, so that as the plunger is driven forwardly into the rear portion 15 of the body it cams the lugs 26 radially outwardly until its rearwardly facing shoulder 28 aligns with the forwardly facing surfaces 31 on the lugs, whereupon the lugs 26 snap into the circumferential recess 27 and engage behind the shoulder 28 to resist withdrawal of the plunger from the body.

Near the front end of the body its inside diameter has an abrupt enlargement that defines a forwardly facing abutment 33 on each of the legs 9. When the plunger is driven all the way forward to its operative position, these abutments 33 on the several legs, under the flexing bias of the divergent legs, snap into place behind the circumferential shoulder 28 on the plunger to resist rearward displacement of the plunger, thus ensuring that the plunger will hold the legs diverged even under severe vibration.

The abutments 33 on the legs can be shallow enough, as measured radially relative to the body, so that their holding force can be overcome by deliberate withdrawal of the plunger 7 from its operative position. Obviously, the radial depths of the circumferential recess 27 in the plunger and of the abutment surfaces 33 could be so selected as to prevent even an intentional withdrawal of the plunger, although for most applications the fastener will probably be designed to permit removal and reuse. When the plunger 7 is deliberately backed away from its operative position, it returns rather readily to the preliminarily assembled position, where the detent lugs 26 engage against its circumferential shoulder 28 with a detent action that yieldingly resists further withdrawal. The fastener can then be removed from the workpiece while the plunger 7 and body 5 remain connected in a convenient condition for reinstallation of the fastener and do not have to be handled separately.

It is noteworthy that in the preliminarily assembled condition of the fastener the plunger extends far enough into the body to derive substantial guidance from it, so that no special tool or special skill is needed to prevent tilting of the plunger during the initial phase of its movement to its operative position.

From the foregoing description and the accompanying drawings it will be apparent that this invention provides a two-piece fastener that is receivable in a round hole in a workpiece and is especially suitable for applications where no substantial force should be exerted against edge portions of the workpiece around the hole in which the fastener is received. The fastener of this invention has the further advantages of being reuseable, easily installed and removed, practically immune to vibration, and particularly well adapted for installations wherein there must be or can be some relative motion between the parts or elements that are connected by the fastener.

What I claim is:

1. A fastener of the type comprising a sleeve-like body that is forwardly insertable into a round hole in a workpiece, said body having a laterally enlarged head at a rear end thereof and having longitudinal slots extending all the way to its front end from near said head to define forwardly projecting flexible legs which are disposed symmetrically to a longitudinal axis of the body, said fastener further comprising a plunger forwardly insertable into the body to an operative position, said plunger and said legs having cooperating camming surfaces whereby the legs are flexingly diverged by movement of the plunger to its operative position, said fastener being characterized by:
  A. said plunger having a circumferential rearwardly facing shoulder which is near its front end but spaced behind the same and which is defined by a reduced diameter portion of the plunger;
  B. said body having, in each of said slots, near the rear end thereof, a detent lug engageable with said shoulder to define a preliminary assembled position of the plunger in which the plunger leaves said legs undiverged, each of said detent lugs being formed in one piece with the body, projecting forwardly in its slot between adjacent legs and in detached relation to them, and being substantially shallow in the direction radial to said axis to be resiliently flexible in that direction independently of the legs, and each detent lug having
    (1) an inner surface that is inclined forwardly and towards said axis and
    (2) a forwardly facing surface which is engageable behind said shoulder and which meets said inner surface at an acute angle; and
  C. each of said legs having near its front end a forwardly facing surface which is engageable against said shoulder when the plunger is in it operative position.

2. A fastener of the type comprising a sleeve-like body that is forwardly insertable into a round hole in a workpiece, said fastener having a rear portion of fixed outside diameter and having a larger diameter concentric head rearwardly adjacent to said rear portion, said fastener further comprising a plunger forwardly insertable into the body to an operative position in which the plunger maintains front portions of the body radially expanded against flexing bias to prevent rearward withdrawal of the body from a workpiece, said fastener being characterized by:
  A. the body having at least three longitudinally extending slots opening to its front end to define forwardly projecting legs
    (1) which are disposed symmetrically to a longitudinal axis of the body and
    (2) each of which is flexingly swingable relative to said rear portion of the body in directions to carry its front end towards and from said axis;
  B. said plunger and said legs having cooperating camming surfaces whereby forward movement of the plunger to an operative position in the body flexingly swings each leg through a predetermined acute angle, from a relaxed position to a flexed position, and thus diverges the front ends of the legs;
  C. each of said legs having on a front end portion thereof a radially outwardly projecting protuberance that has a substantially flat rear surface
    (1) the rear surfaces of the several protuberances being so disposed as to be substantially coplanar and normal to said axis when the legs are in their flexed positions, and
    (2) said protuberances being of such size in the radial direction that when the legs are relaxed, the width of the body across them is no greater than the outside diameter of said rear portion, but is greater than that outside diameter when the legs are in their flexed position;
  D. said plunger having a reduced diameter portion near its front end that defines a rearwardly facing circumferential shoulder thereon; and
  E. said body having a lug at the rear end of each of said slots therein which projects forwardly in the slot in detached relation to its adjacent legs and which is shallow in said radial direction to be flexible radially outwardly independently of the legs, each of said lugs
    (1) having an inner surface which is inclined forwardly and radially inwardly from camming cooperation with the plunger and
    (2) having a forwardly facing surface which is detent-wise engageable with said shoulder to define a preliminarily assembled position of the plunger in the body.

3. The fastener of claim 2, further characterized by:
  D. said legs having external surfaces which extend longitudinally substantially from said rear portion of the body to said rear surfaces on the projections and which, when the legs are in their relaxed positions, are inclined forwardly and towards said axis at said acute angle to said axis to provide the body with forward taper, the inclination of said external surfaces at said acute angle enabling the body to have substantially uniform width between its head and the rear surfaces of said projections when the legs are in their flexed positions.

4. The fastener of claim 2, further characterized by:
  F. each of said legs having a forwardly facing surface on a front end portion thereof that is detent-wise engageable with said surface on the plunger to define the operative position of the plunger.

* * * * *